(12) United States Patent
Kosugi

(10) Patent No.: US 8,177,893 B2
(45) Date of Patent: May 15, 2012

(54) FUEL VAPOR PROCESSING APPARATUS

(75) Inventor: Ryuji Kosugi, Obu (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 359 days.

(21) Appl. No.: 12/634,020

(22) Filed: Dec. 9, 2009

(65) Prior Publication Data

US 2010/0147152 A1 Jun. 17, 2010

(30) Foreign Application Priority Data

Dec. 11, 2008 (JP) .................................. 2008-315650

(51) Int. Cl.
*B01D 53/04* (2006.01)
*F02M 25/08* (2006.01)

(52) U.S. Cl. ........................................ 96/126; 96/146

(58) Field of Classification Search .................. 95/146; 96/121, 126, 131, 132, 143, 146, 153; 123/518–520
See application file for complete search history.

(56) References Cited

U.S. PATENT DOCUMENTS

| 6,503,301 | B2 * | 1/2003 | Uchino et al. | 96/132 |
| 7,323,041 | B2 * | 1/2008 | Yoshida et al. | 96/132 |
| 7,615,108 | B2 * | 11/2009 | Yoshida et al. | 96/108 |
| 7,785,407 | B2 * | 8/2010 | Abe et al. | 96/153 |
| 7,841,321 | B2 * | 11/2010 | Kosugi et al. | 123/519 |
| 7,909,919 | B2 * | 3/2011 | Kosugi et al. | 96/126 |
| 7,922,797 | B2 * | 4/2011 | Kosugi et al. | 96/147 |

FOREIGN PATENT DOCUMENTS

| JP | 63-246462 | 10/1988 |
| JP | 64-066461 | 3/1989 |
| JP | 2005 233106 | 9/2005 |
| JP | 2005 282481 | 10/2005 |

* cited by examiner

*Primary Examiner* — Frank Lawrence, Jr.
(74) *Attorney, Agent, or Firm* — Dennison, Schultz & MacDonald

(57) ABSTRACT

One aspect according to the present invention includes a fuel vapor processing apparatus having a case containing a mixture of an adsorption material and a heat storage material therein. A mixing ratio of the heat storage material to the adsorption material is set to be higher for a central area away from a circumferential wall of the case or a flow passage defined in the case than for an outer peripheral area close to the circumferential wall.

15 Claims, 5 Drawing Sheets

FUEL VAPOR PROCESSING APPARATUS

This application claims priority to Japanese patent application serial number 2008-315650, the contents of which are incorporated herein by reference.

BACKGROUND OF THE INVENTION

1. Field of the Invention

The present invention relates to fuel vapor processing apparatus for processing fuel vapor (for example, gasoline vapor) produced within fuel tanks.

2. Description of the Related Art

Vehicles represented by automobiles have a canister as a fuel vapor processing apparatus for processing gasoline vapor (vaporized gasoline) produced within a fuel tank. Generally, the canister has a case formed as a hollow container and an adsorption material disposed within the case. The case has a tank port for drawing gasoline vapor produced within the fuel tank and an atmospheric port for drawing atmospheric air. The adsorption material consists of activated carbon granules that adsorb or desorb the gasoline vapor. More specifically, the gasoline vapor is temporally adsorbed by the adsorption material in the canister and desorbed from the adsorption material under predetermined conditions.

When the adsorption material adsorbs the gasoline vapor, so-called adsorption heat is generated because this process is an exothermic process. On the other hand, when the gasoline vapor is desorbed from the adsorption material, the adsorption material is cooled because this process is an endothermic process to increase in a kinetic energy.

As the adsorption material adsorbs gasoline vapor, the temperature of the adsorption material increases. This in turn reduces the adsorption ability of the adsorption material. As the gasoline vapor is desorbed from the adsorption material, the adsorption material is cooled. This in turn reduces the vapor desorption ability of the adsorption material.

Mixing a heat storage material with an adsorption material is a well-known technique for preventing such degradation of the adsorption and desorption abilities of the adsorption material. This technique of mixing the heat storage material can maintain the adsorption and desorption abilities of the adsorption material during the exothermic process and the endothermic process.

Because the amount or volume of the adsorption material to be contained within the canister is previously determined, the size of the canister depends on the amount or volume of the heat storage material to be mixed with the adsorption material. Therefore, it is necessary to reduce the amount of the heat storage material in order to minimize the size of the canister. Japanese Laid-Open Patent Publication No. 2005-282481 sets out a technique for minimizing the amount or volume of the heat storage material by changing the mixing amount of the heat storage material.

However, there still exists a problem in the above well-known technique. Although a part of the adsorption material filled adjacent to a surrounding wall constituting the case and separating inside and outside of the case can easily exchange heat with the outside via the surrounding wall, another part of the adsorption material filled distant from the surrounding wall is difficult to exchange heat with the outside.

More specifically, it is difficult for the adsorption material positioned in a central area of the case to exchange heat with the outside. Therefore, heat and chill tend to remain in a part of the adsorption material filled in the central area of the case compared to the other parts of the adsorption material positioned in other areas of the case. Accordingly, the adsorption and desorption abilities of the adsorption material have become less effective.

Therefore, there is a need in the art for a fuel vapor processing apparatus that can improve a fuel vapor adsorption performance.

SUMMARY OF THE INVENTION

One aspect according to the present invention includes a fuel vapor processing apparatus having a case containing a mixture of an adsorption material and a heat storage material therein. A mixing ratio of the heat storage material to the adsorption material is set to be higher for a central area away from a circumferential wall of the case or a flow passage defined in the case than for an outer peripheral area close to the circumferential wall.

DETAILED DESCRIPTION OF THE INVENTION

Figure 1:
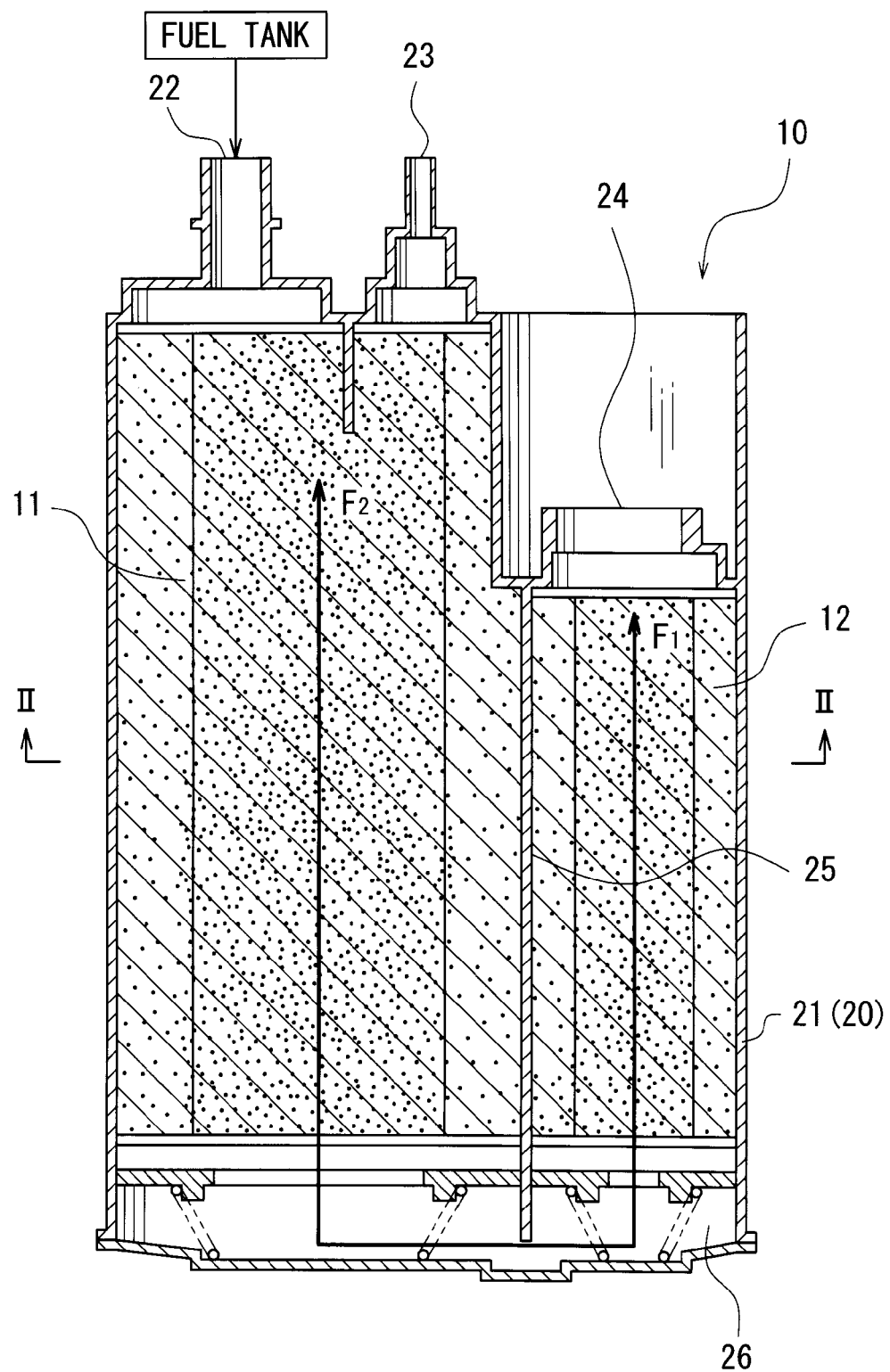
FIG. 1 is a sectional view of a canister according to a first embodiment of the present invention as viewed in a cross section along directions of flow of gasoline vapor.

Each of the additional features and teachings disclosed above and below may be utilized separately or in conjunction with other features and teachings to provide improved fuel vapor processing apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a fuel vapor processing apparatus for processing fuel vapor produced within a fuel tank includes a case configured as a hollow container, an adsorption material disposed within the case and capable of adsorbing the fuel vapor, and a heat storage material mixed with the adsorption material and capable of exchange heat with the adsorption material. A mixing ratio of the heat storage material to the adsorption material is set such that the mixing ratio for a central side area within a flow area of the fuel vapor within the case with respect to a cross section intersecting with a direction of flow of the fuel vapor is higher than the mixing ratio for an outer peripheral side area within the flow area.

According to the above arrangement, the adsorption material disposed in the central side area can be easily heat-exchanged than that disposed in the outer peripheral side area. Hence it is possible to prevent heat or chill from being remained in the central side area. As a result, it is possible to effectively maintain the adsorption ability and the desorption ability of the processing apparatus. It is also possible to improve the mixing efficiency of the heat storage material and to reduce the amount of the heat storage material. Consequently, it is possible to downsize the processing apparatus and to reduce the manufacturing cost.

In another embodiment, a mixing ratio of the heat storage material to the adsorption material is set such that the mixing ratio for a central side area within the case with respect to a cross section intersecting with a direction of flow of the fuel vapor is higher than the mixing ratio for an outer peripheral side area of the case.

Also with this arrangement, the adsorption material disposed in the central side area can be easily heat-exchanged than that disposed in the outer peripheral side area.

The mixing ratio may gradually increase from an outer periphery of the flow area or the case towards a central point of the central side area of the flow area or the case. Here, the term "gradually increase" is used to mean that the mixing ratio increases in a stepwise manner or in a continuous manner. With this arrangement, it is possible to further improve the heat exchange function for the adsorption material.

The mixing ratio may change along the flow direction of the fuel vapor. With this arrangement, it is possible to improve the heat exchange function for the adsorption material depending on the required adsorption or desorption ability that may change along the flow direction. For example, it is possible to change the mixing ratio depending on the position of an inlet port (tank port) of the case for introducing the fuel vapor into the case or a discharge port (an atmospheric port) of the case.

Embodiments of the present invention will now be described with reference to the drawings. Fuel vapor processing apparatus according to these embodiments are configured as canisters that can be installed on vehicles and can process gasoline vapor (fuel vapor) produced within fuel tanks.

First Embodiment

Figure 2:
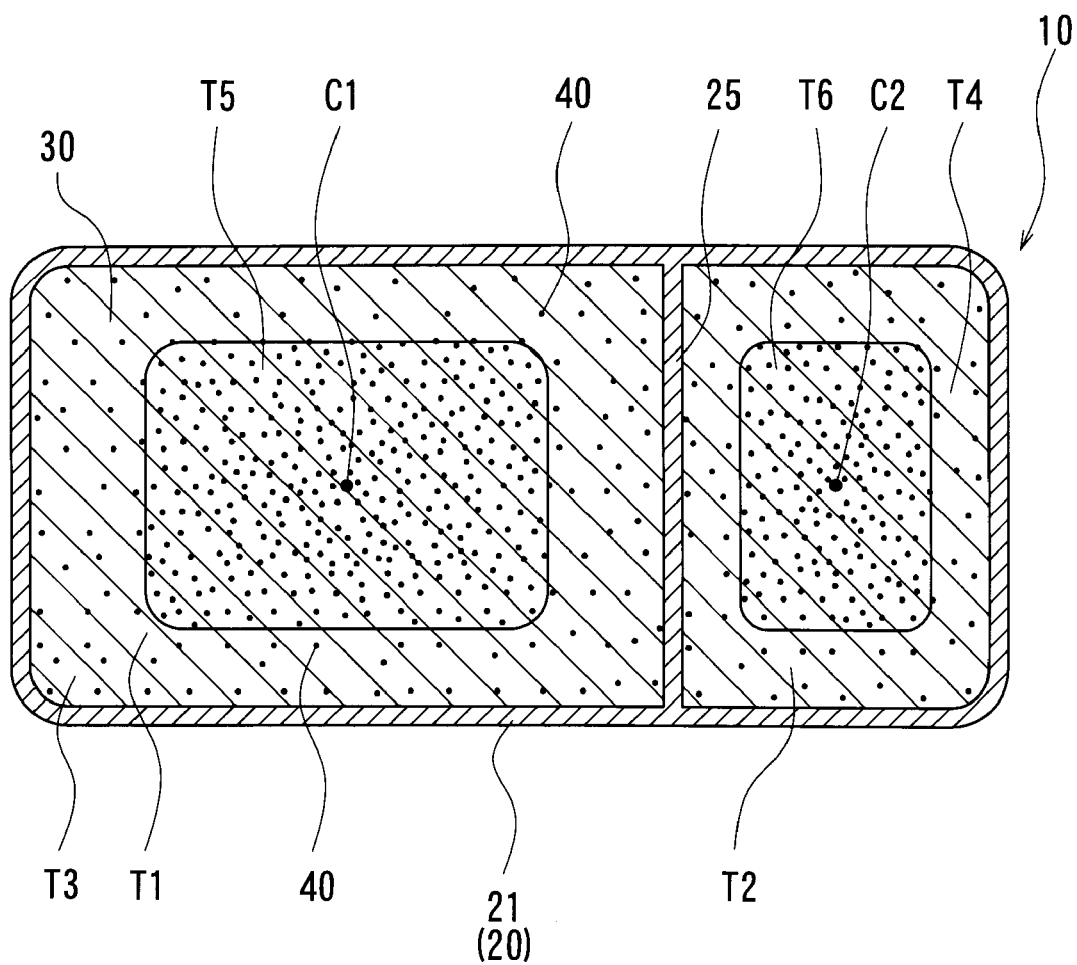
FIG. 2 is a sectional view of the canister shown in FIG. 1 taken along line II-II.

A canister 10 according to a first embodiment will be explained with reference to FIG. 1 and FIG. 2. FIG. 1 is a sectional view of the canister 10 along directions F1 and F2 of flow of gasoline vapor or air. FIG. 2 is a sectional view of the canister taken along line II-II in FIG. 1.

The canister 10 shown in FIG. 1 can process gasoline vapor (vaporized gasoline) produced within a fuel tank (not shown). The canister 10 generally has a case 20, an adsorption material 30 contained within the case 20 and a heat storage material 40 mixed with the adsorption material 30.

As shown in FIG. 1, the case 20 is formed in a hollow container shape with a surrounding wall 21 for separating inside and outside of the case 20. The case 20 has three ports in order to communicate inside and outside of the case 20. Specifically, the case 20 has a tank port 22, a purge port 23 and an atmospheric port 24.

The tank port 22 is used for introducing the gasoline vapor produced inside the fuel tank into the canister 10. The tank port 22 is connected with the side of the fuel tank via a hose (not shown). The purge port 23 is used for discharging the gasoline vapor produced in the canister 10 to the outside. The purge port 23 is connected with the side of an engine via a hose (not shown). The atmospheric port 24 is used for introducing air (atmosphere) into the canister 10. The atmospheric port 24 is connected with the side of an air intake port via a horse (not shown).

A separation wall 25 is formed inside the case 20 so that the case 20 is divided into two chambers, i.e., a first hollow chamber 11 and a second hollow chamber 12. The separation wall 25 is made of a material having high heat conductivity, and is formed integrally with the surrounding wall 21 that forms the case 20. Therefore, the separation wall 25 also has high heat conductivity with the outside as with the surrounding wall 21.

The tank port 22 and the purge port 23 are respectively communicated with the first hollow chamber 11 that is separated from the second hollow chamber 12 by the separation wall 25. The atmospheric port 24 is communicated with the second hollow chamber 12. The first hollow chamber 11 and the second hollow chamber 12 are communicated with each other via a communicating chamber 26 that is positioned on the opposite side of the ports 22, 23 and 24.

The canister 10 has an U-shaped flow structure so that the gasoline vapor can flow along a U-shaped flow path in the direction F1 or F2.

In order to adsorb the gasoline vapor, the gasoline vapor is introduced from the tank port 22 into the first hollow chamber 11 in the gasoline vapor flow direction F1. Thereafter, the gasoline vapor flows into the second hollow chamber 12 and then reaches the atmospheric port 24, from which the gasoline vapor is discharged.

In order to disorb the gasoline vapor, air (atmospheric air) is introduced from the atmospheric port 24 into the second hollow chamber 12. Thereafter, the air flows into the first hollow chamber 11 and then discharged from the purge port 23 (the flow direction F2).

A flow area within a cross section intersecting with (perpendicular to) the flow directions F1 and F2 is determined as follows. Because the gasoline vapor moves between the separated first hollow chamber 11 and second follow chamber 12, the flow area of the gasoline vapor (or air) is separately determined for the first hollow chamber 11 and the second hollow chamber 12.

As shown in FIG. 2, the entire cross sectional area of the first hollow chamber 11 intersecting with the flow directions F1 and F2 within the first hollow chamber 11 is determined as a flow area T1 within the first hollow chamber 11. The entire cross sectional area of the second hollow chamber 12 intersecting with the flow directions F1 and F2 within the second hollow chamber 12 is determined as a flow area T2 within the second hollow chamber 12.

The flow area T1 is further divided into two flow areas T3 and T5. Similarly, the flow area T2 is further divided into two flow areas T4 and T6. More specifically, the flow area T1 is divided into the flow area T3 (hereinafter also called "peripheral side area T3") positioned on the side of the outer periphery of the flow area T1 and the flow area T5 (hereinafter also called "central side area T5") positioned on the central side of the flow area T3. The flow area T2 is divided into the flow area T4 (hereinafter also called "hereinafter also called "peripheral side area T4") positioned on the side of the outer periphery of the flow area T2 and the flow area T6 (hereinafter also called "central side area T6) positioned on the central side of the flow area T4. The central side areas T5 and T6 have central points C1 and C2, respectively.

In the first embodiment, the term "outer periphery" is used to mean portions of the flow areas T1 and T2 that are surrounded by the surrounding wall 21 and the separation wall 25. Although, the surrounding wall 21 and the separation wall 25 are made of heat exchangeable material in this embodiment, both or one of them may be made of material that is hard to exchange heat or has low heat conductivity. In other words, the heat of the peripheral side area T3 may be easier or harder to be heat exchanged than the heat of the central side are T5. Similarly, the heat of the peripheral side area T4 may be easier or harder to be heat exchanged than the heat of the central side area T6. It is only necessary that the central side areas T5 and T6 are closer to the central points C1 and C2 compared to the peripheral side areas T3 and T4, respectively.

However, it may be preferable that the surrounding wall 21 and the separation wall 25 are made of material that is heat exchangeable with outside, so that the heat of the peripheral side areas T3 and T4 can be easily heat exchanged and the heat of the central side areas T5 and T6 is hard to be heat exchanged compared to the peripheral side areas T3 and T4.

The adsorption material 30 is filled within the first hollow chamber 11 and the second hollow chamber 12 defined in the case 20. The adsorption material 30 consists of activated carbon in forms granules for adsorbing the gasoline vapor and may be granulated carbon or fractured carbon. The heat storage material 40 serves to exchange heat with the adsorption material 30. Similar to the adsorption material 30, the heat storage material 40 is filled within the first hollow chamber 11 and the second follow chamber 12 so that it is mixed with the adsorption material 30.

As the heat storage material 40, various kinds of materials can be used as long as they utilize phase-change materials that can adsorb and desorb latent heat in response to change of temperature. For example, as disclosed in Japanese Laid-Open Patent Publication No. 2005-282481, microcapsules sealingly containing a phase-change material capable of adsorbing and desorbing latent heat in response to change of temperature may be used for the heat storage material 40. Further, the microcapsules filled with the phase-change material can be mixed with a suitable binder and then molded into granules to form the heat storage material 40.

As examples, organic compounds and inorganic compounds having melting points of 10° C.-80° C. can be used as the phase-change material.

In this embodiment, normal-paraffin is used as the phase-change material. However, linear aliphatic hydrocarbon, such as tetradecane, pentadecane, hexadecane, heptadecane, octadecane, nonadecane, eicosanic acid, henicosane and docosane, may also be used.

Hydrate of inorganic compound, such as natural wax, petroleum wax, LiNO3.3H2O, Na2SO4.10H2O and Na2HPO4.12H2O, may be also used as the phase-change material. Further, fatty acid, such as capric acid and lauryl acid, higher alcohol having a carbon number of 12-15, and ester, such as palmitic acid methyl, stearin acid methyl may be used.

Two or more of the above chemical compounds listed above may also concurrently be used as the phase-change material. The above compound(s) may be used as a center core material(s) for producing microcapsules by a known process, such as a coacervation process and an in-situ method (interfacial reaction process). Known materials such as melamine, gelatin and glass may be used to form outer shells of the microcapsules. Preferably, the diameter of granules of the heat storage material 40 in forms of microcapsules is approximately between a few μm and a few dozens μm in view of a necessary heat storage amount per unit volume.

The mixing ratio of the heat storage material 40 to the adsorption material 30 is determined to be higher in the central side areas T5 and T6 of the flow areas T1 and T2 than the peripheral side areas T3 and T4 of the flow areas T1 and T2, respectively, within the cross section intersecting with the flow directions F1 and F2.

More specifically, the mixing ratio of the heat storage material 40 to the adsorption material 30 in the peripheral side areas T3 and T4 is determined to be 0-15%. Whereas, the mixing ratio of the heat storage material 40 to the adsorption material 30 in the central side areas T5 and T6 is determined to be 15-40%.

The canister 10 according to the first embodiment constructed as described above may provide with the following functions and effects.

With the canister 10, the mixing ratio of the heat storage material 40 to the adsorption material 30 within the cross section intersecting with the flow directions F1 and F2 is determined to be higher in the central side areas T5 and T6 (of the flow areas T1 and T2) than the peripheral side areas T3 and T4 (of the flow areas T1 and T2), respectively. Therefore, among the adsorption material 30 in the case 20 for adsorbing gasoline vapor into the adsorption material 30, heat of parts of the adsorption material 30 positioned within the central areas T5 and T6 (of the flow areas T1 and T2) may more effectively be exchanged than heat of parts of the adsorption material 30 positioned within the peripheral side areas T3 and T4 (of the flow areas T1 and T2), respectively.

According to the known art, it has been difficult for a part of an adsorption material positioned within a central side area of a flow area to be exchanged with the outside. However, according to the canister 10 of this embodiment, the heat exchange ability of parts of the adsorption material 30 positioned within the central areas T5 and T6 can be improved and thus, it is possible to prevent heat and chill from being remained in the adsorption material 30.

Therefore, the canister 10 enables to effectively maintain the adsorption and desorption abilities of the gasoline vapor and improve efficiency in mixing of the heat storage material 40. In this way, the amount or volume of the heat storage material 40 can be reduced and accordingly, the canister 10 can be downsized and the production costs may be reduced.

Figure 3:
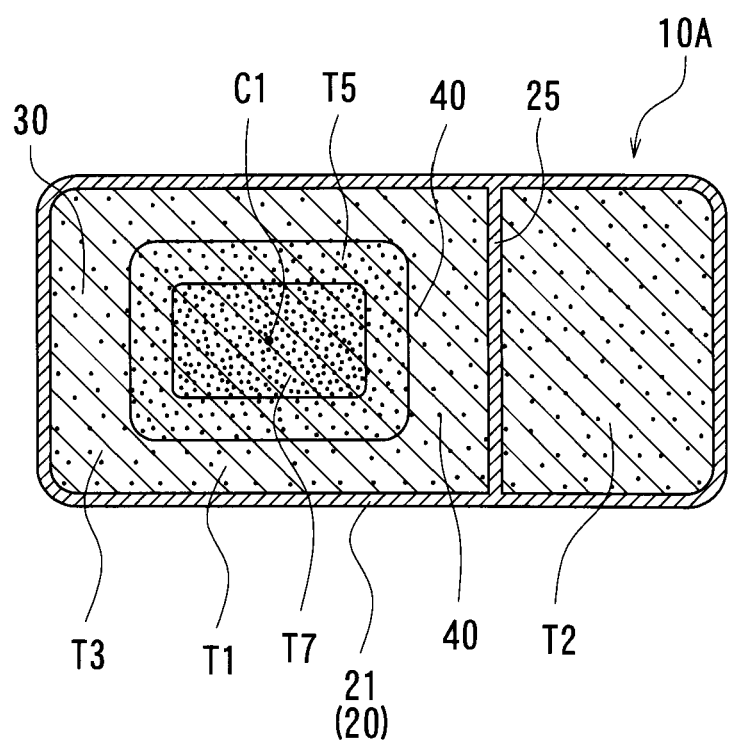
FIG. 3 is a sectional view similar to FIG. 2 but showing an alternative embodiment of the canister shown in FIG. 2.
Figure 4:
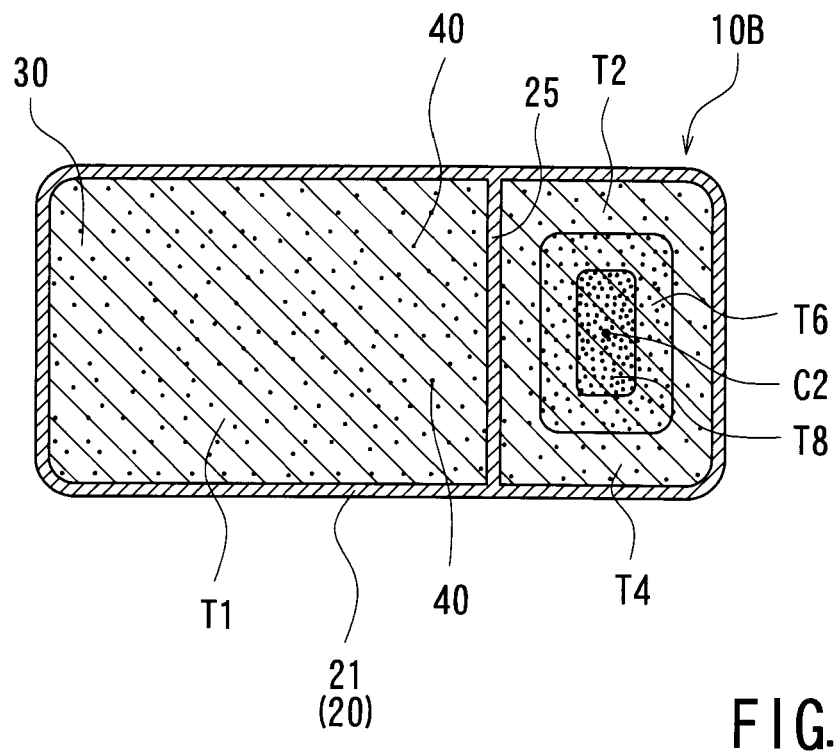
FIG. 4 is a sectional view similar to FIG. 2 but showing another alternative embodiment of the canister shown in FIG. 2.

The canister 10 of the first embodiment may be modified as shown in FIGS. 3 and 4. In FIGS. 3 and 4, the same reference numerals are allocated to the same parts constructed in the same manner with the first embodiment, and an explanation of these parts will be omitted.

FIG. 3 shows a canister 10A, which is one of alternative examples of the canister 10 shown in FIG. 2. According to the canister 10A shown in FIG. 3, only the flow area T1 (of the gasoline vapor or air) of the first hollow chamber 11 is divided into two areas, i.e., the peripheral side area T3 and the central side area T5. In other words, the canister 10A shown in FIG. 3 is not divided at the flow area T2 in the second hollow chamber 12. Furthermore, the mixing amount or the mixing ratio of the heat storage material 40 within the flow area T2 may be the same or substantially the same as the mixing ratio in the peripheral side area T3 of the flow area T1.

Within the flow area T1 of the first hollow chamber 11, the mixing ratio of the heat storage material 40 to the adsorption material 30 is determined to be gradually increased towards the central point C1 within the cross section intersecting with the flow directions F1 and F2. More specifically, as shown in FIG. 3, within the central side area T5, the mixing ratio of the heat storage material 40 to the adsorption material 30 is gradually increased at a more centrally positioned area T7 close to the central point C1 of the central side area T5.

According to this construction, only the first hollow chamber 11 of the canister 10A may provide the above described functions and effects. With respect to the second hollow chamber 12, as the mixing ratio of the heat storage material 40 to the adsorption material 30 is small, the size and the production cost of the canister 10A may be reduced.

Further, according to the above construction, the mixing ratio of the heat storage material 40 to the adsorption material 30 is determined to be gradually increased towards the central point C1 within the cross section intersecting with the flow directions F1 and F2. Accordingly, the heat exchange capab of the adsorption material 30 may be gradually increased towards the central point C1 and it is possible to further effectively prevent heat or chill from being remained in the adsorption material 30.

FIG. 4 shows a canister 10B, which is another alternative example of the canister 10 shown in FIG. 2. According to the canister 10B shown in FIG. 4, only the flow area T2 (of the gasoline vapor or air) of the second hollow chamber 12 is divided into two areas, i.e., the peripheral side area T4 and the central side area T6. In other words, the canister 10B shown in FIG. 4 is not divided at the flow area T2 in the first hollow chamber 11. Furthermore, the mixing amount or the mixing ratio of the heat storage material 40 within the flow area T1 may be the same or substantially the same as the mixing ratio in the peripheral side area T4 of the flow area T1.

Within the flow area T2 of the second hollow chamber 12, the mixing ratio of the heat storage material 40 to the adsorption material 30 is determined to be gradually increased towards the central point C2 within the cross section intersecting with the flow directions F1 and F2. More specifically, as shown in FIG. 4, within the central side area T6, the mixing ratio of the heat storage material 40 to the adsorption material 30 is gradually increased at a more centrally positioned area T8 close to the central point C2 of the central area T6.

According to this construction, only the second hollow chamber 11 of the canister 10B may provide the above described functions and effects. With respect to the first hollow chamber 11, as the mixing ratio of the heat storage material 40 to the adsorption material 30 is small, the size and the production cost of the canister 10B may be reduced.

Further, according to the above construction, the mixing ratio of the heat storage material 40 to the adsorption material 30 is determined to be gradually increased towards the central point C2 within the cross section intersecting with the flow directions F1 and F2. Accordingly, the heat exchange ability of the adsorption material 30 may be gradually increased towards the central point C2 and it is possible to further effectively prevent heat or chill from being remained in the adsorption material 30.

Second Embodiment

Figure 5:
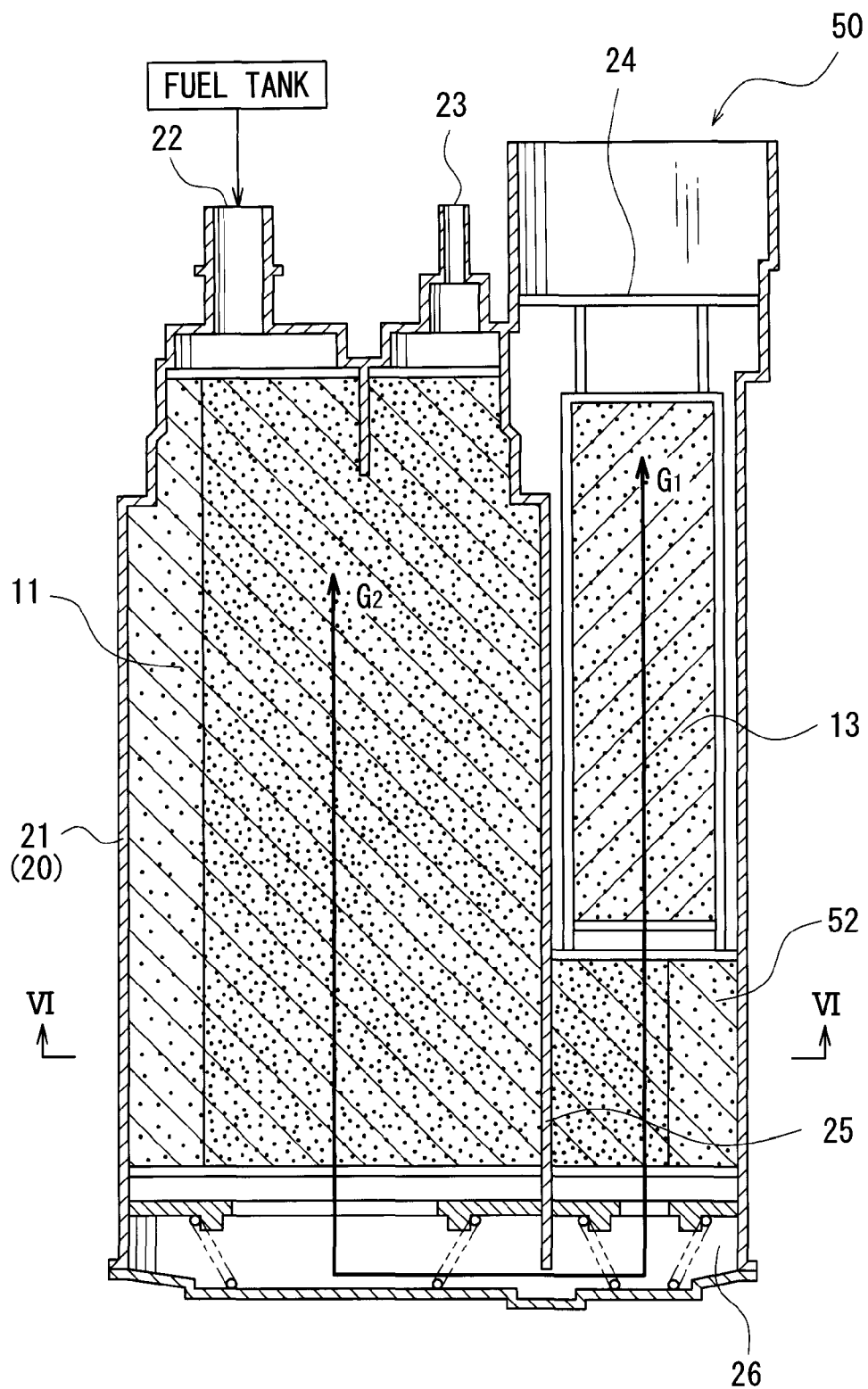
FIG. 5 is a sectional view of a canister according to a second embodiment of the present invention as viewed in a cross section along directions of flow of gasoline vapor.
Figure 6:
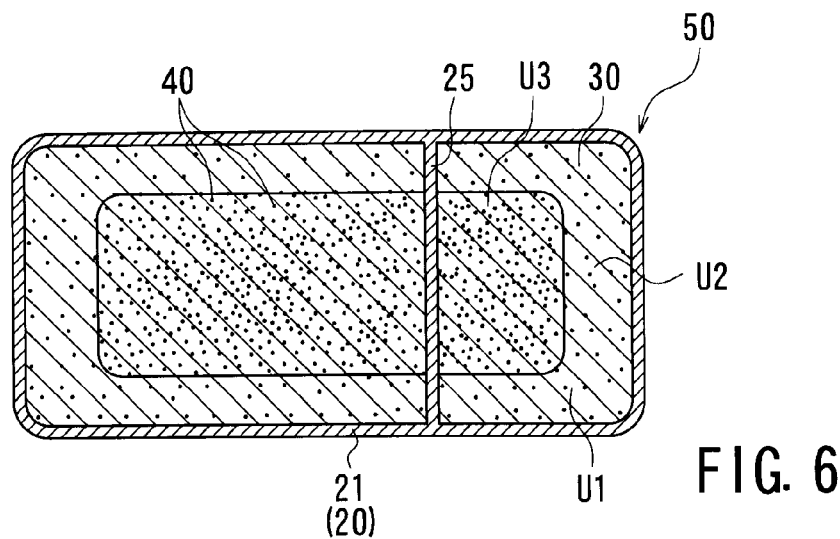
FIG. 6 is a sectional view of the canister shown in FIG. 5 taken along line VI-VI.

A canister 50 according to a second embodiment of the present invention will now is described with reference to FIG. 5 and FIG. 6. In FIGS. 5 and 6, the same reference numerals as the first embodiment are allocated to the same members as the first embodiment, and the description of these members will be omitted.

FIG. 5 is a cross sectional view taken along flow directions G1 and G2 of gasoline vapor or air of a canister 50 according to the second embodiment. FIG. 6 is a cross sectional view of the canister 50 taken along line VI-VI in FIG. 5. The internal space or volume of a second hollow chamber 52 of the canister 50 shown in FIG. 5 and FIG. 6 is determined to be substantially half of that of the second hollow chamber 12 of the first embodiment. Honeycomb activated carbon granules 13 are filled between the second hollow chamber 52 and the atmospheric port 24.

The canister 50 according to the second embodiment differs from the canister 10 of the first embodiment in the distribution of a mixing ratio of the heat storage material 40 to the adsorption material 30.

As described previously, according to the canister 10 of the first embodiment, the flow areas T1 and T2 within the cross section intersecting with the flow directions F1 and F2 are further divided into the peripheral side areas T3 and T4, and the central side areas T5 and T6, respectively. The mixing ratio of the heat storage material 40 is differentiated between the peripheral side area T3 and the central side area T5 and between the peripheral side area T4 and the central side area T6.

According to the canister 50 of the second embodiment, as shown in FIG. 6, an internal area U1 of the case 20 within a cross section intersecting with flow directions G1 and G2 of the gasoline vapor or air is divided into two areas, i.e. a peripheral side area U2 on the peripheral side of the case 20 (hereinafter also called "case peripheral side area U2") and a central side area U3 on the central side of the case 20 (hereinafter also called "case central side area U3"). The mixing ratio of heat storage material 40 is differentiated between the case peripheral side area U2 and the case central side area U3.

In the case of the first embodiment, the term "periphery" is used for identifying the areas surrounded or defined by the surrounding wall 21 and the separation wall 25 made of material that can exchange heat with outside. However, the term "periphery" in the case of the second embodiment refers to an area surrounded only by the surrounding wall 21 made of material that can exchange heat. In other words, the separation wall 25 does not define the "periphery."

According to the second embodiment, the mixing ratio of the heat storage material 40 to the adsorption material 30 is set to be higher in the case central side area U3 than the case peripheral side area U2 within the intersecting cross section with the flow directions G1 and G2.

More specifically, the mixing ratio of the heat storage material 40 to the adsorption material 30 within the case peripheral side area U2 is determined to be 0-15%. Whereas, the mixing ratio of the heat storage material 40 to the adsorption material 30 is determined to be 15-40% in the case central side area U3.

With the canister 50 according to the second embodiment, the mixing ratio of the heat storage material 40 to the adsorption material 30 is determined to be higher within the case central side area U3 than in the case peripheral side area U2 within the cross section intersecting with the flow directions G1 and G2. Accordingly, when the gasoline vapor is adsorbed by the adsorption material 30, heat of the adsorption material 30 positioned within the case central side area U3 can be more effectively exchanged than heat of the adsorption material 30 positioned within the case peripheral side area U2.

Therefore, the adsorption material 30 within the case central side area U3 can be effectively heat changed and it is possible to avoid heat and chill from being remained in the adsorption material 30. Accordingly, the canister 50 can effectively maintain the adsorption and desorption abilities of the gasoline vapor and improve the mixing efficiency of the heat storage material 40 to reduce the amount or volume of the heat storage material 40 to be mixed. Eventually, the size and the manufacturing cost of canister 50 may be reduced.

Figure 7:
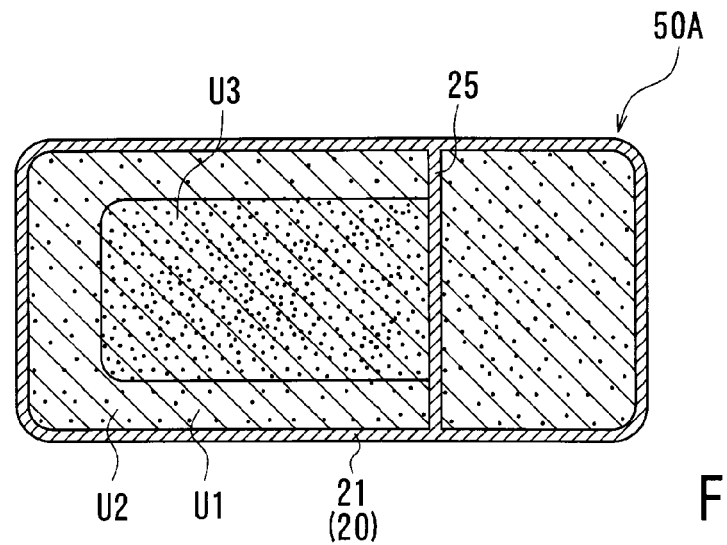
FIG. 7 is a sectional view similar to FIG. 6 but showing an alternative embodiment of the canister shown in FIG. 6.

The canister 50 according to the second embodiment can be modified as shown in FIGS. 6 and 7. In FIGS. 6 and 7, the same reference numerals with the second embodiment are allocated for the same members as the second embodiment, and an explanation of these members will not be repeated.

FIG. 7 shows a canister 50A, which is one of modified examples of the canister 50 shown in FIG. 6. Specifically, the canister 50A shown in FIG. 7 is an example in which the division of the case internal area U1 into the case peripheral side area U2 and the case central side area U3 is made only in the first hollow chamber 11. In other words, the second hollow chamber 12 within the canister 50A shown in FIG. 7 is not divided. The mixing ratio of the heat storage material 40 within the second hollow chamber 12 may be the same with the mixing ratio of the heat storage material 40 within the case peripheral side area U2.

According to the above construction, only the first hollow chamber 11 within the canister 50A can provide the above functions and effects. Because the mixing amount of the heat storage material 40 within the first hollow chamber 11 is small, the canister 50A may be downsized and the cost for manufacturing the same may be reduced.

Figure 8:
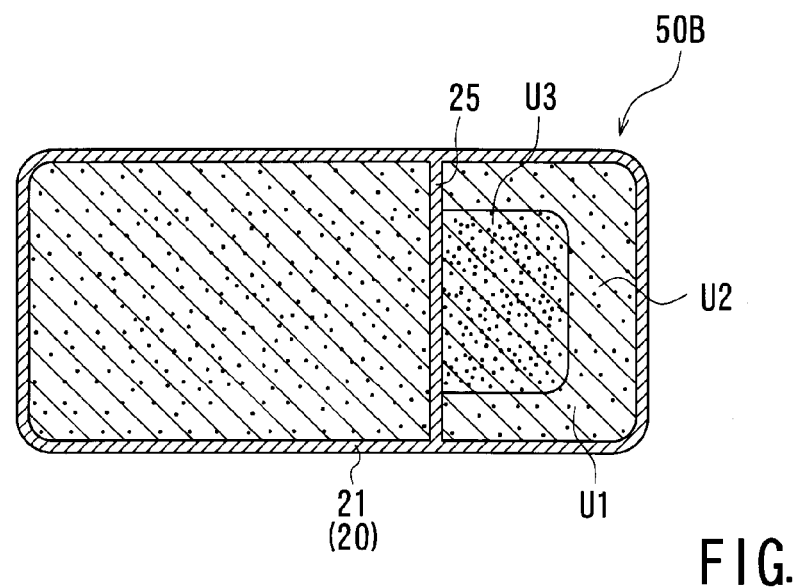
FIG. 8 is a sectional view similar to FIG. 6 but showing another alternative embodiment of the canister shown in FIG. 6.

FIG. 8 shows a canister 50B, which is another modified example of the canister 50 shown in FIG. 6. The canister 50B shown in FIG. 8 is an example in which the case internal area U1 is divided into the case peripheral side area U2 and the case central side area U3 only in the second hollow chamber 12. In other words, the first hollow chamber 11 of the canister 50B shown in FIG. 8 is not divided. The mixing ratio of the heat storage material 40 within the first hollow chamber 11 may be the same with the mixing ratio of the heat storage material 40 within the case peripheral side area U2.

According to this construction, only the second hollow chamber 12 within the canister 50B may provide the above functions and effects. Because the mixing amount of the heat storage material 40 within the first hollow chamber 11 may be small, it is possible to downsize the canister 50B and the cost for manufacturing the same may be reduced.

The fuel vapor processing apparatus according to the present invention may not be limited to the above-described embodiments and their modifications but can be modified further in various ways.

For example, in the above embodiments, the canisters 10 and 50 have U-shaped gasoline vapor flow structures. In other words, the flow directions F1 and F2 in the canister 10 and the flow directions G1 and G2 of the canister 50 are U-shaped. However, the canisters 10 and 50 may have I-shaped flow structures.

According to the canister 10 of the first embodiment, the mixing ratio of the heat storage material 40 to the adsorption material 30 is set to be slightly higher at the central side areas T7 and T8 which are close to the central points C1 and C2 of the central side areas T5 and T6, respectively, so that the mixing ratio gradually increase toward the central side areas T7 and T8. However, the mixing ratio may be set in different ways as long as the mixing ratio becomes gradually higher towards the central point of the central area. Thus, it is not questioned whether the mixing ratio is gradually increased in a stepwise manner by the divided areas, or the mixing ratio is continuously increased towards the central point of the central area without incorporating the divided areas.

Further, the canister 10 or 50 in the above embodiment may be modified such that the mixing ratio of the heat storage material 40 to the adsorption material 30 changes along the flow directions F1 and F2. More specifically, the mixing ratio of the heat storage material 40 to the adsorption material 30 may be determined to gradually increase toward the downstream side in the flow direction F1 of the gasoline vapor. Alternatively, the mixing ratio may be determined to gradually increase toward downstream side in the flow direction F2.

With the above construction, the mixing ratio of the heat storage material 40 can be changed according to change of arrangement or construction on the side of the tank port 22 or the side of the atmospheric port 24. Accordingly, it is possible to cope with the adsorption and desorption abilities of the gasoline vapor, which may change depend on positions within the canister 10, and it is possible to more effectively prevent heat and chill from being remained in the adsorption material 30.

Similar to the canister 10 of the first embodiment, the canister 50 of the second embodiment may also be configured to increase the mixing ratio of the heat storage material 40 towards the central point of the central side area U3. Moreover, the mixing ratio of the heat storage material 40 to the adsorption material 30 may be determined to be increased towards the downstream side in the flow direction G1.

What is claimed is:

1. A fuel vapor processing apparatus for processing fuel vapor produced within a fuel tank, comprising:
   a case configured as a hollow container;
   an adsorption material disposed within the case and capable of adsorbing the fuel vapor; and
   a heat storage material mixed with the adsorption material and capable of exchange heat with the adsorption material;
   wherein a mixing ratio of the heat storage material to the adsorption material is set such that the mixing ratio for a central side area within a flow area of the fuel vapor within the case with respect to a cross section intersecting with a direction of flow of the fuel vapor is higher than the mixing ratio for an outer peripheral side area within the flow area.

2. The fuel vapor processing apparatus as in claim 1, wherein:
   the mixing ratio gradually increases from an outer periphery of the flow area towards a central point of the central side area.

3. The fuel vapor processing apparatus as in claim 1, wherein:
   the mixing ratio changes along the flow direction of the fuel vapor.

4. The fuel vapor processing apparatus as in claim 2, wherein:
   the mixing ratio changes along the flow direction of the fuel vapor.

5. The fuel vapor processing apparatus as in claim 1,
   wherein the case includes a separation wall dividing an internal space of the case into a first chamber and a second chamber communicating with each other and each containing a mixture of the adsorption material and the heat storage material;
   wherein the fuel vapor can flow into the first chamber and subsequently flow into the second chamber for adsorption by the adsorption material contained in each of the first and second chambers;
   wherein the flow area comprises a first flow area defined by the first chamber and a second flow area defined by the second chamber;
   wherein the first flow area includes a first central side area and a first outer peripheral side area with respect to a cross section intersecting with a direction of flow of the fuel vapor within the first flow area; and wherein the mixing ratio for the first central side area is higher than the mixing ratio for the first outer peripheral side area;

wherein the second flow area includes a second central side area and a second outer peripheral side area with respect to a cross section intersecting with a direction of flow of the fuel vapor within the second flow area; and wherein the mixing ratio for the second central side area is higher than the mixing ratio for the second outer peripheral side area.

6. The fuel vapor processing apparatus as in claim 5, wherein each of the case and the separation wall is made of material having high heat conductivity.

7. The fuel vapor processing apparatus as in claim 1, wherein the case has an outer surface directly exposed to the outer side of the case.

8. A fuel vapor processing apparatus for processing fuel vapor produced within a fuel tank, comprising:
a case configured as a hollow container;
an adsorption material disposed within the case and capable of adsorbing the fuel vapor; and
a heat storage material mixed with the adsorption material and capable of exchange heat with the adsorption material;
wherein a mixing ratio of the heat storage material to the adsorption material is set such that the mixing ratio for a central side area in the case with respect to a cross section intersecting with a direction of flow of the fuel vapor is higher than the mixing ratio for an outer peripheral side area of the case.

9. The fuel vapor processing apparatus as in claim 8, wherein:
the mixing ratio gradually increases from an outer periphery of the case towards a central point of the central side area.

10. The fuel vapor processing apparatus as in claim 8, wherein:
the mixing ratio changes along the flow direction of the fuel vapor.

11. The fuel vapor processing apparatus as in claim 9, wherein:
the mixing ratio changes along the flow direction of the fuel vapor.

12. The fuel vapor processing apparatus as in claim 8,
wherein the case includes a separation wall dividing an internal space of the case into a first chamber and a second chamber communicating with each other and each containing a mixture of the adsorption material and the heat storage material;
wherein the fuel vapor can flow into the first chamber and subsequently flow into the second chamber for adsorption by the adsorption material contained in each of the first and second chambers;
wherein the flow area comprises a first flow area defined by the first chamber and a second flow area defined by the second chamber.

13. The fuel vapor processing apparatus as in claim 12, wherein each of the case and the separation wall is made of material having high heat conductivity.

14. The fuel vapor processing apparatus as in claim 8, wherein the case has an outer surface directly exposed to the outer side of the case.

15. A fuel vapor processing system comprising:
a fuel tank; and
a case communicating with the fuel tank and defining an internal space containing a mixture of an adsorption material and a heat storage material therein, the adsorption material being capable of adsorbing fuel vapor produced within the fuel tank and entering the case;
wherein the fuel vapor flows through the internal space of the case in a flow direction; and
wherein a mixing ratio of the heat storage material to the adsorption material is set such that the mixing ratio on a central side of a cross sectional area of the internal space perpendicular to the flow direction is higher than the mixing ratio on an outer peripheral side of the cross sectional area.

* * * * *